United States Patent
Kasaiezadeh Mahabadi et al.

(10) Patent No.: US 10,589,739 B2
(45) Date of Patent: Mar. 17, 2020

(54) AUTOMATED DRIVING COMMANDS INTERPRETATION FOR STABILITY CONTROL

(71) Applicant: GM GLOBAL TECHNOLOGY OPERATIONS LLC, Detroit, MI (US)

(72) Inventors: Seyedalireza Kasaiezadeh Mahabadi, Shelby Township, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 263 days.

(21) Appl. No.: 15/486,540

(22) Filed: Apr. 13, 2017

(65) Prior Publication Data

US 2018/0297587 A1 Oct. 18, 2018

(51) Int. Cl.
| | | |
|---|---|---|
| *B60W 30/045* | (2012.01) | |
| *B60W 10/04* | (2006.01) | |
| *B60W 10/20* | (2006.01) | |
| *B60W 10/18* | (2012.01) | |
| *B60W 50/00* | (2006.01) | |

(52) U.S. Cl.
CPC .......... *B60W 30/045* (2013.01); *B60W 10/04* (2013.01); *B60W 10/18* (2013.01); *B60W 10/20* (2013.01); *B60W 50/00* (2013.01); *B60W 2050/0014* (2013.01); *B60W 2050/0062* (2013.01); *B60W 2400/00* (2013.01); *B60W 2550/14* (2013.01); *B60W 2710/18* (2013.01); *B60W 2710/20* (2013.01); *B60W 2720/106* (2013.01); *B60W 2720/14* (2013.01)

(58) Field of Classification Search
CPC .... B60W 30/045; B60W 10/04; B60W 10/18; B60W 10/20; B60W 50/00; B60W 40/114
USPC .......................................................... 701/41
See application file for complete search history.

(56) References Cited

U.S. PATENT DOCUMENTS

| | | | |
|---|---|---|---|
| 8,073,607 B2 | 12/2011 | Sidlosky et al. | |
| 2004/0158377 A1* | 8/2004 | Matsumoto | B60T 8/17557 701/48 |
| 2008/0208406 A1* | 8/2008 | Chen | B60W 10/18 701/41 |
| 2015/0158524 A1* | 6/2015 | Lee | B62D 15/025 701/41 |
| 2016/0259338 A1* | 9/2016 | Nakamura | B60W 30/12 |
| 2018/0281857 A1* | 10/2018 | Choi | B60W 10/18 |

\* cited by examiner

*Primary Examiner* — Nadeem Odeh
(74) *Attorney, Agent, or Firm* — Lorenz & Kopf, LLP (57) ABSTRACT

A control system for providing a yaw moment control action is provided. The control system comprises a command interpreter and a control segment. The command interpreter is configured to generate desired current vehicle states, when a vehicle is driven manually, wherein the current vehicle states comprise a target yaw rate state and a target lateral velocity state. The command interpreter is further configured to generate a desired states vector, when the vehicle is driven autonomously, using vehicle path planning instructions, wherein the desired states vector comprises current and future ideal yaw rate and lateral velocity states. The control segment is configured to generate a yaw moment control action using the desired current vehicle states when the vehicle is driven manually and generate a yaw moment control action using the desired states vector when the vehicle is driven autonomously.

20 Claims, 6 Drawing Sheets

AUTOMATED DRIVING COMMANDS INTERPRETATION FOR STABILITY CONTROL

TECHNICAL FIELD

The technology described in this patent document relates generally to stability control systems in vehicles, and more particularly to an automated driving control interpreter in a vehicle stability control system.

BACKGROUND

Stability control systems have been employed to improve driver safety. Stability control systems may employ differential braking, active or semi-active suspension, active front steering and/or active rear wheel steering to provide the stability control. A stability control system determines the desired vehicle performance by considering steering, braking and acceleration inputs and compares the actual vehicle response with the desired vehicle performance. The vehicle stability control system may include a driver command interpreter (DCI) to determine the desired vehicle behavior.

The stability control system receives vehicle dynamics information from various sensors, such as yaw rate sensors, lateral acceleration sensors, vehicle speed sensors, wheel speed sensors, hand-wheel angle sensors, tire force sensors, wheel force sensors, roll rate sensors, and others to calculate or estimate various vehicle parameters and states. The vehicle parameters and states, as well as target (or desired) states, are used by the stability control system to provide actuator command signals to provide the stability control. The DCI is used to define the target states including the desired yaw rate. Conventional DCIs employ current (and sometimes previous) steering wheel angle, vehicle velocities and accelerations, and a road condition estimate to define the desired states.

For autonomously driven vehicles additional vehicle parameters and states are calculated. Also, in autonomous driven vehicles, steering and acceleration commands are planned in advance (sometimes 10 seconds or even more) of the time that the commands are actually sent to the relevant actuators. The additional vehicle parameters and the future driving instructions that are available in autonomously driven vehicles are not used in conventional stability control systems to compute actuator command signals.

Accordingly, it is desirable to provide a system for using planned steering and velocity information to calculate actuator command signals and allow a vehicle to proactively take an appropriate action ahead of time to prevent the possibility of the vehicle getting into the unstable modes. Furthermore, other desirable features and characteristics of the present invention will become apparent from the subsequent detailed description of the invention and the appended claims, taken in conjunction with the accompanying drawings and the background of the invention.

SUMMARY

A control system for generating a yaw moment control action is provided. The control system includes a command interpreter and a control segment. The command interpreter is configured to generate desired current vehicle states, when a vehicle is driven manually, based on driver steering and acceleration inputs wherein the current vehicle states include a target yaw rate state and a target lateral velocity state. The command interpreter is further configured to generate a desired states vector, when the vehicle is driven autonomously, using vehicle path planning instructions, wherein the desired states vector includes current and future ideal yaw rate states and current and future ideal lateral velocity states. The control segment is configured to generate a yaw moment control action for the current time using the desired current vehicle states when the vehicle is driven manually and generate a yaw moment control action for the current time using the desired states vector when the vehicle is driven autonomously. The control segment is further configured to send the generated yaw moment control action to a stability control system in the vehicle.

A method in a vehicle stability control system is provided. The method includes determining if the vehicle is being driven manually or autonomously, generating desired current vehicle states when the vehicle is driven manually based on driver steering and acceleration inputs wherein the current vehicle states include a target yaw rate state and a target lateral velocity state, and generating a desired states vector when the vehicle is driven autonomously using vehicle path planning instructions wherein the desired states vector includes current and future ideal yaw rate states and current and future ideal lateral velocity states. The method further includes generating a yaw moment control action for the current time using the desired current vehicle states when the vehicle is driven manually, generating a yaw moment control action for the current time using the desired states vector when the vehicle is driven autonomously, and using the generated yaw moment control action in the stability control system in the vehicle.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

The subject matter described herein discloses apparatus, systems, techniques and articles for using future (pre-planned) driving commands in vehicle stability control systems. The described techniques allow for an automated driving command interpreter (ADCI) in a stability control system to take advantage of pre-planned motions to enhance the stability control quality. The described techniques can take advantage of predictable steering and acceleration/deceleration commands generated in autonomous and automated driving applications to better avoid unstable operating modes. The described techniques can take advantage of pre-planned commands and a preview of the road to assist in maintaining vehicle stability.

Figure 1:
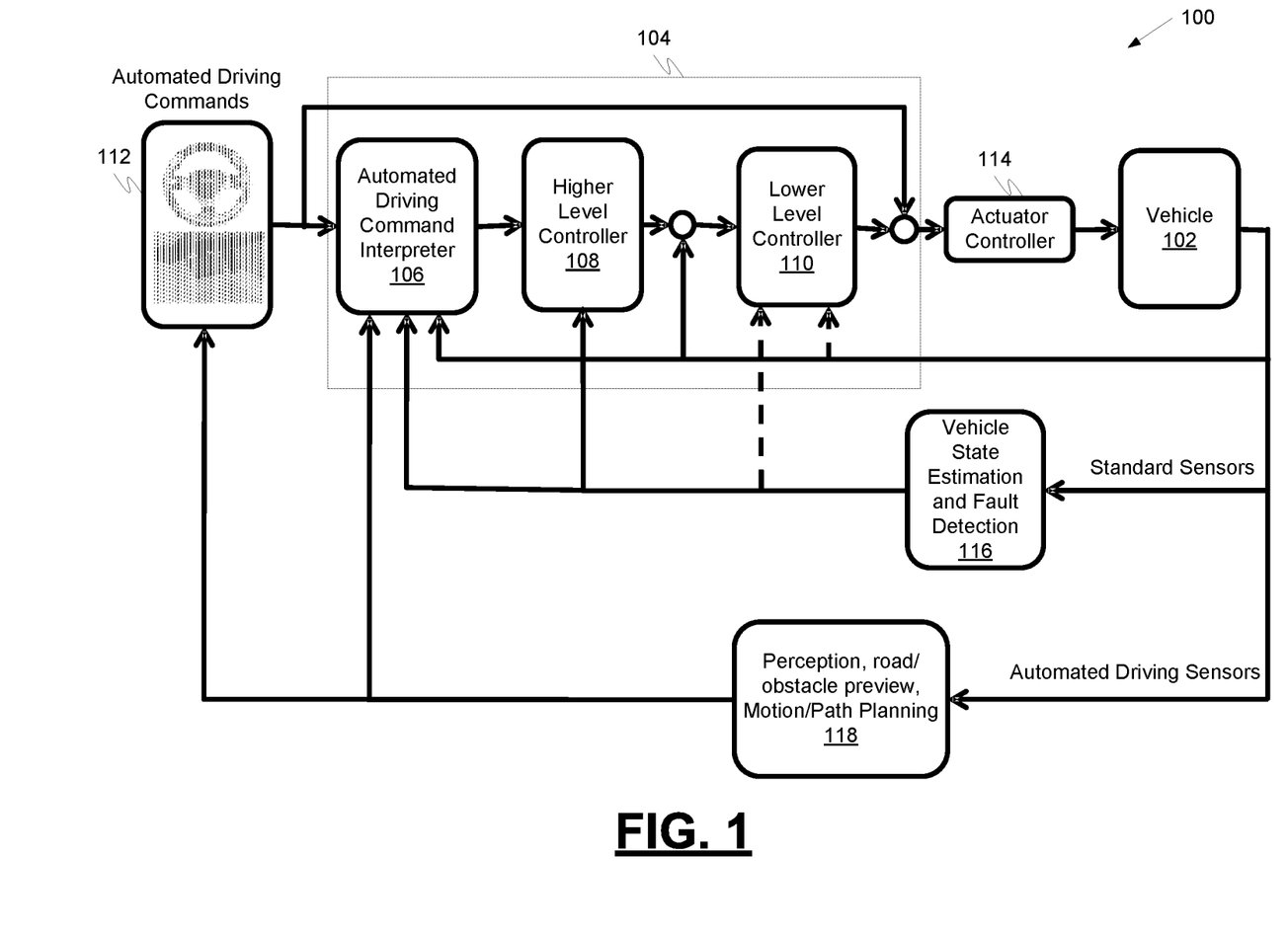
FIG. 1 is a block diagram depicting an example control architecture for an example vehicle, in accordance with some embodiments.

FIG. 1 is a block diagram 100 depicting an example control architecture for an example vehicle 102. In one embodiment, the example vehicle 102 comprises an automobile that includes steering components, acceleration components, and braking components. In another embodiment, the example vehicle may be a type of light truck such as a sports utility vehicle, a minivan, or others. The example vehicle 102 is autonomous driving capable and includes an example stability control system 104. The example stability control system 104 includes an automated driving command interpreter 106, a higher level controller 108, and a lower level controller 110.

The automated driving command interpreter 106 receives driving commands from a driving command block 112 that can alternatively issue automated driving commands when the vehicle 102 is autonomously driven or manual driving commands when the vehicle 102 is manually operated by a driver. When manually driven, the driving command block 112 converts inputs from driver steering control, driver braking, and/or driver acceleration into manual driving commands. When autonomously driven, the driving command block 112 converts vehicle motion information and vehicle path planning instructions into automated driving commands.

In addition to receiving manual and/or automated driving commands from the driving command block 112, the example automated driving command interpreter 106 receives vehicle dynamics information from various sensors, such as yaw rate sensors, lateral acceleration sensors, vehicle speed sensors, wheel speed sensors, hand-wheel angle sensors, tire force sensors, wheel force sensors, roll rate sensors, and others. The automated driving command interpreter 106 also receives vehicle state estimation and fault detection parameters 116 derived from standard sensors and automated driving sensor derived parameters 118 relating to perception, road/obstacle preview, and motion/path planning. The automated driving command interpreter 106 uses this information to calculate or estimate various vehicle states and a desired state vector ($\chi_d$). In this example, the vehicle states include the desired yaw rate ($r_{des}^i$) and the desired lateral velocity ($v_{ydes}^i$). The vehicle states and state vectors, in this example, may be calculated using the formulas (1), (2), and (3) illustrated below:

$$r_{des}^j = \frac{u_i(\delta_i)}{2(L + K_{us}u_i^2)} \quad (1)$$

$$v_{ydes}^i = r_{des}^j \times \left(b - \frac{am}{LC_{r,dry}}u_i^2\right) \; 1 \leq i \leq N \quad (2)$$

where $K_{us}$ is the desired under steer coefficient.

$\delta_i$ and $u_i$ are steering angle on road and vehicle velocity at each future time step.

a, b are the distance between front and rear axles to CG, respectively.

m, L and u are mass, wheel base and the velocity of vehicle.

--$C_{r,dry}$-- is the rear lateral tire stiffness on a dry road.

$$\chi_d = [r_{des}^1, V_{ydes}^1, \ldots, r_{des}^N, v_{ydes}^N]^T \quad (3)$$

$\chi_d$ is the desired states vector based on the preview and the path/motion planning.

The vehicle stability control system determines if the vehicle is manually driven or autonomously driven. If manually driven, the example automated driving command interpreter 106 performs conventional DCI functions and calculates vehicle states such as yaw rate and lateral velocity rate. If autonomously driven, the automated driving command interpreter 106 makes use of the automated driving sensor derived parameters 118 in addition to the vehicle motion parameters and vehicle state estimation and fault detection parameters 116 to calculate a desired states vector that includes current and planned future states for parameters such as the yaw and the lateral velocity.

The example automated driving command interpreter 106 may be implemented using one or more processors configured by programming instructions encoded on non-transient computer readable media. The programming instructions when executed, in this example, cause the one or more processors to perform a method comprising generating, when a vehicle is driven manually, desired vehicle states based on driver steering and acceleration inputs wherein the vehicle states include a target yaw rate state and a target lateral velocity state. The method further comprises generating a desired states vector when the vehicle is driven autonomously using vehicle path planning instructions wherein the desired states vector includes current and future ideal yaw rate states and current and future ideal lateral velocity states.

The higher level controller 108 and the lower level controller 110 combine to form a controller that converts desired or ideal vehicle states (e.g., yaw rate and lateral velocity) into actuator control commands provided to vehicle actuator controllers 114 such as a braking actuator controller, a steering actuator controller, and an accelerator actuator controller. In this example, the higher level controller 108 uses the desired or ideal vehicle states (e.g., yaw rate and lateral velocity) in a predictive model to predict a control action such as a yaw moment control action to achieve the desired vehicle states. The lower level controller 110 uses the control action to generate actuator control commands.

In this example, model predictive control (MPC) is used as the predictive model to predict the yaw moment control action. An example of MPC is illustrated by the equations shown below:

$$x(k+1) = Ax(k) + Bu(k) + w(t) \quad (4)$$

$$\chi = S^x x(0) + S^u U_0 \quad (5)$$

-continued $$\epsilon = \chi - \chi_d \quad (6)$$

$$\chi = \{x(0)|x(1)|\ldots|x(N-1)\}^T = \begin{bmatrix} I \\ A \\ A^2 \\ \vdots \\ A^N \end{bmatrix} x(0) + \begin{bmatrix} 0 & \ldots & \ldots & 0 \\ B & 0 & \ldots & 0 \\ AB & \ddots & \ddots & \vdots \\ \vdots & \ddots & \ddots & \vdots \\ A^N B & \ldots & \ldots & B \end{bmatrix} U_0 \quad (7)$$

$$J = \epsilon^T \overline{Q} \epsilon + U_0^T \overline{R} U_0, \text{ while } \overline{Q} = \begin{bmatrix} Q & 0 & \ldots & 0 \\ 0 & \ddots & 0 & \vdots \\ \vdots & 0 & Q & 0 \\ 0 & \ldots & 0 & P \end{bmatrix}, \overline{R} = \begin{bmatrix} R & 0 & 0 \\ 0 & \ddots & 0 \\ 0 & 0 & R \end{bmatrix} \quad (8)$$

$$\min J = U_0^T H U_0 + 2g U_0 + C \text{ where} \quad (9)$$

$$H = S^{u^T} \overline{Q} S^u + \overline{R} \quad (10)$$

$$g = x_0^T S^{x^T} \overline{Q} S^u - \chi_d^T \overline{Q} S^u \quad (11)$$

$$C = \text{constant terms.} \quad (12)$$

$$U_0^* = -H^{-1} g, \text{ where } U_0^* \text{ is the yaw moment control action} \quad (13)$$

The example higher level controller 108 may be implemented by one or more processors configured by programming instructions encoded on non-transient computer readable media causing the one or more processors to implement a method comprising generating a yaw moment control action for the current time using the desired current vehicle states when the vehicle is driven manually and generating a yaw moment control action for the current time using the desired states vector when the vehicle is driven autonomously. Generating the yaw moment control action using the desired states vector may comprise predicting the yaw moment control action using a predictive control algorithm. Predicting the yaw moment control action may comprise predicting using future steering, acceleration, and braking profiles to determine optimum yaw moment control for the current time.

Although the example of FIG. 1 illustrated a controller formed from a higher level controller 108 and a lower level controller 110, in other examples an integrated controller may be used. An example integrated controller may generate the yaw moment control action internally using the desired states vector and use the internally generated yaw moment control action to generate actuator control commands to provide to vehicle actuator controllers.

Figure 2:
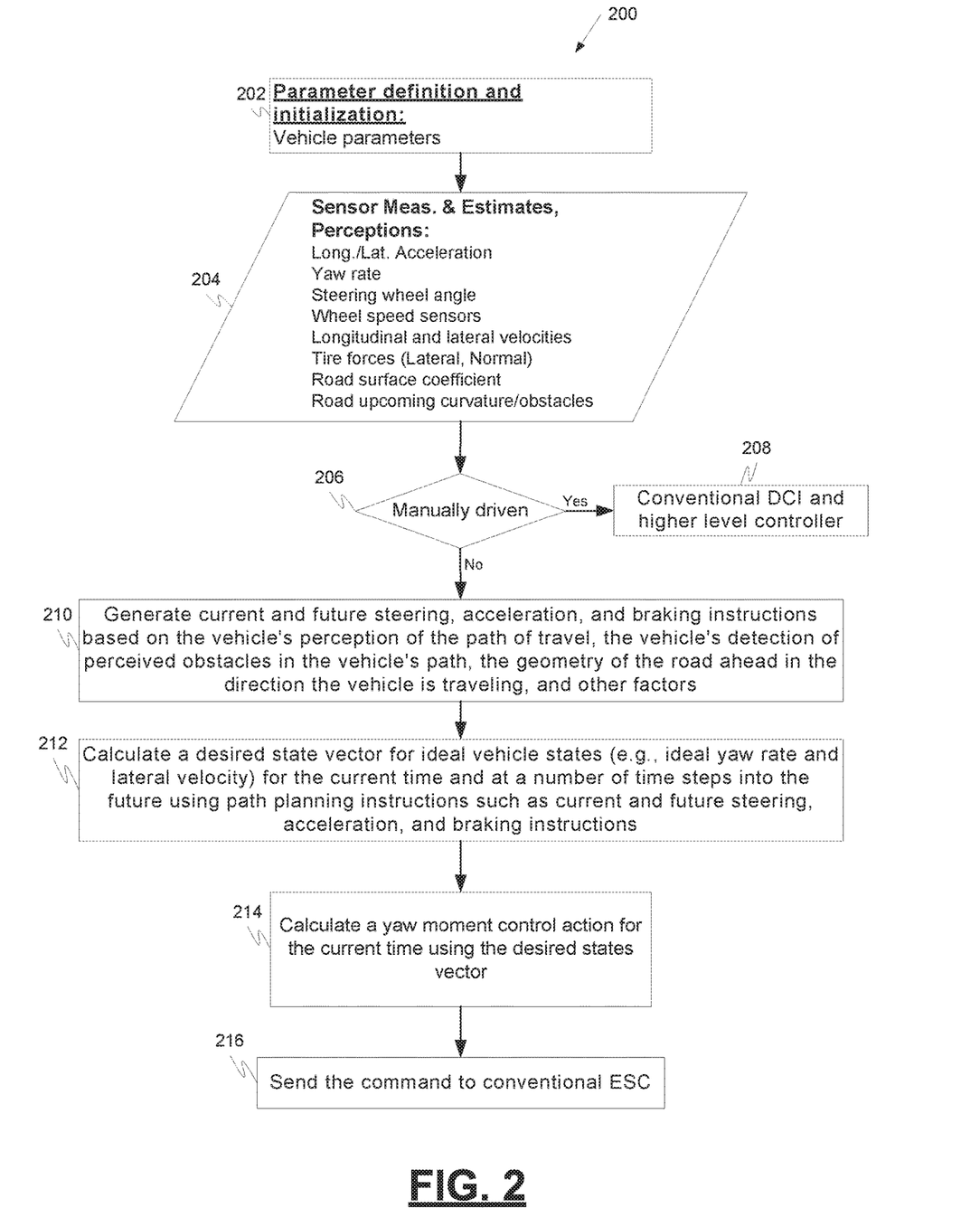
FIG. 2 is a process flow chart depicting an example process for generating a yaw moment control action for use by a vehicle's stability control system, in accordance with some embodiments.

FIG. 2 is a process flow chart depicting an example process 200 for generating a yaw moment control action for use by a vehicle's stability control system. Various vehicle parameters are defined and initialized (operation 202). After initialization, vehicle parameters from sensor measurements, estimates, and perceptions are received by the stability control system (block 204). Examples of the parameters include longitudinal acceleration, lateral acceleration, yaw rate, steering wheel angle, wheel speed sensors, longitudinal velocity, lateral velocity, tire forces (lateral, normal), road surface coefficient, road upcoming curvature, road upcoming obstacles. A determination is made by the stability control system regarding whether the vehicle is driven manually be a driver or autonomously (decision 206).

If driven manually, conventional driver command interpreter (DCI) and higher level controller functions take place (operation 208). This may include generating desired current vehicle states based on driver steering and acceleration inputs wherein the current vehicle states include a target yaw rate state and a target lateral velocity state and generating a yaw moment control action for the current time using the desired current vehicle states.

If the vehicle is driven autonomously, the vehicle generates current and future steering, acceleration, and braking instructions based on the vehicle's perception of the path of travel, the vehicle's detection of perceived obstacles in the vehicle's path, the geometry of the road ahead in the direction the vehicle is traveling, and other factors (operation 210). The stability control system calculates a desired state vector for ideal vehicle states (e.g., ideal yaw rate and lateral velocity) for the current time and at a number of time steps into the future using path planning instructions such as current and future steering, acceleration, and braking instructions. (operation 212). The calculation of a desired state vector for ideal vehicle states or a number of time steps into the future, in this example, includes a number of desired vehicle states in the next few seconds (e.g., next 10 seconds). The desired state vector may be calculated using an automated driving command interpreter (ADCI) such as example ADCI 106.

The stability control system next calculates a yaw moment control action for the current time using the desired states vector (operation 214). In this example, a higher level controller uses a predictive control algorithm such as a model predictive control algorithm to calculate the yaw moment control action using the desired states vector. In this example, predicting the yaw moment control action includes predicting using future steering, acceleration, and braking profiles to determine optimum yaw moment control for the current time.

After the planned yaw moment control action is generated, it may be used by the stability control system in the vehicle control the vehicle (operation 216). This may involve generating control commands to send to an actuator controller in the vehicle such as a braking actuator controller, a steering actuator controller, and an accelerator actuator controller. The control commands may be generated by a lower level controller or an integrated controller that also generates the yaw moment control.

Figure 3:
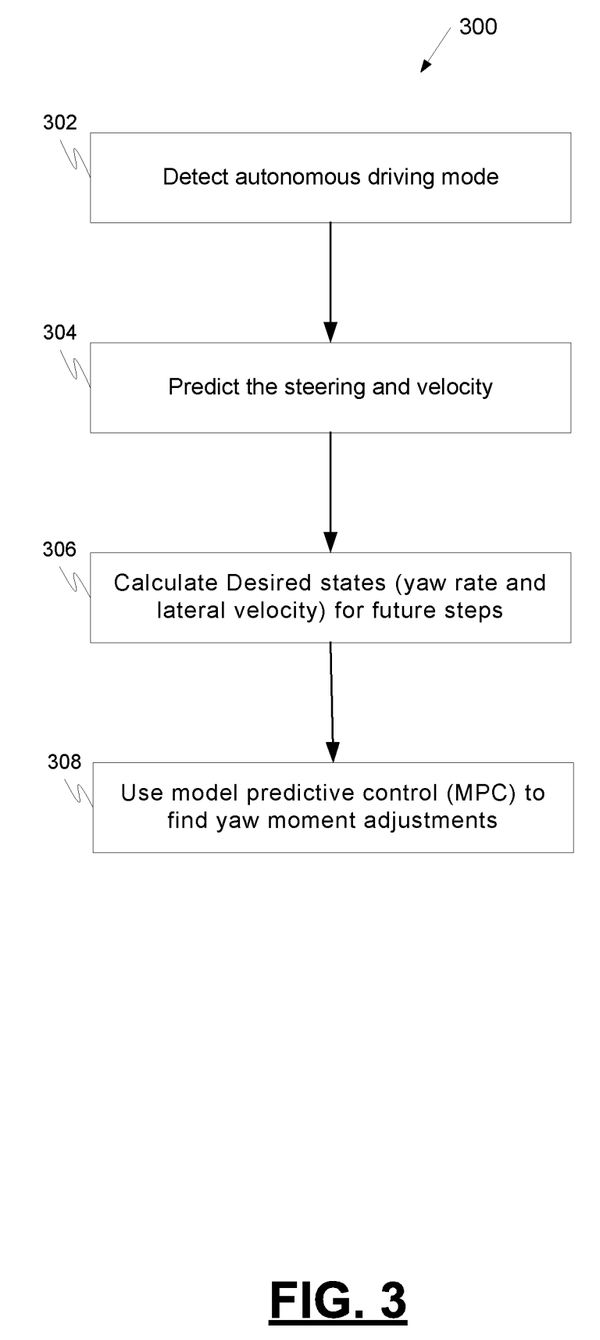
FIG. 3 is a process flow chart depicting another example process for generating a yaw moment control action for use in a vehicle's stability control system, in accordance with some embodiments.

FIG. 3 is a process flow chart depicting another example process 300 for generating a yaw moment control action for use in a vehicle's stability control system. In the example process 300, it is detected that the vehicle is operating in an autonomous driving mode (operation 302). Future steering and velocity states are planned by the vehicle (operation 304). The vehicle's stability control system calculates desired states such as yaw rate and lateral velocity for the current and future time steps (operation 306). The vehicle's stability control system uses model predictive control to determine yaw moment adjustments (operation 308). In this example, an ADCI may be used to calculate the desired states and a higher level controller may be used to determine yaw moment adjustments.

Figure 4:
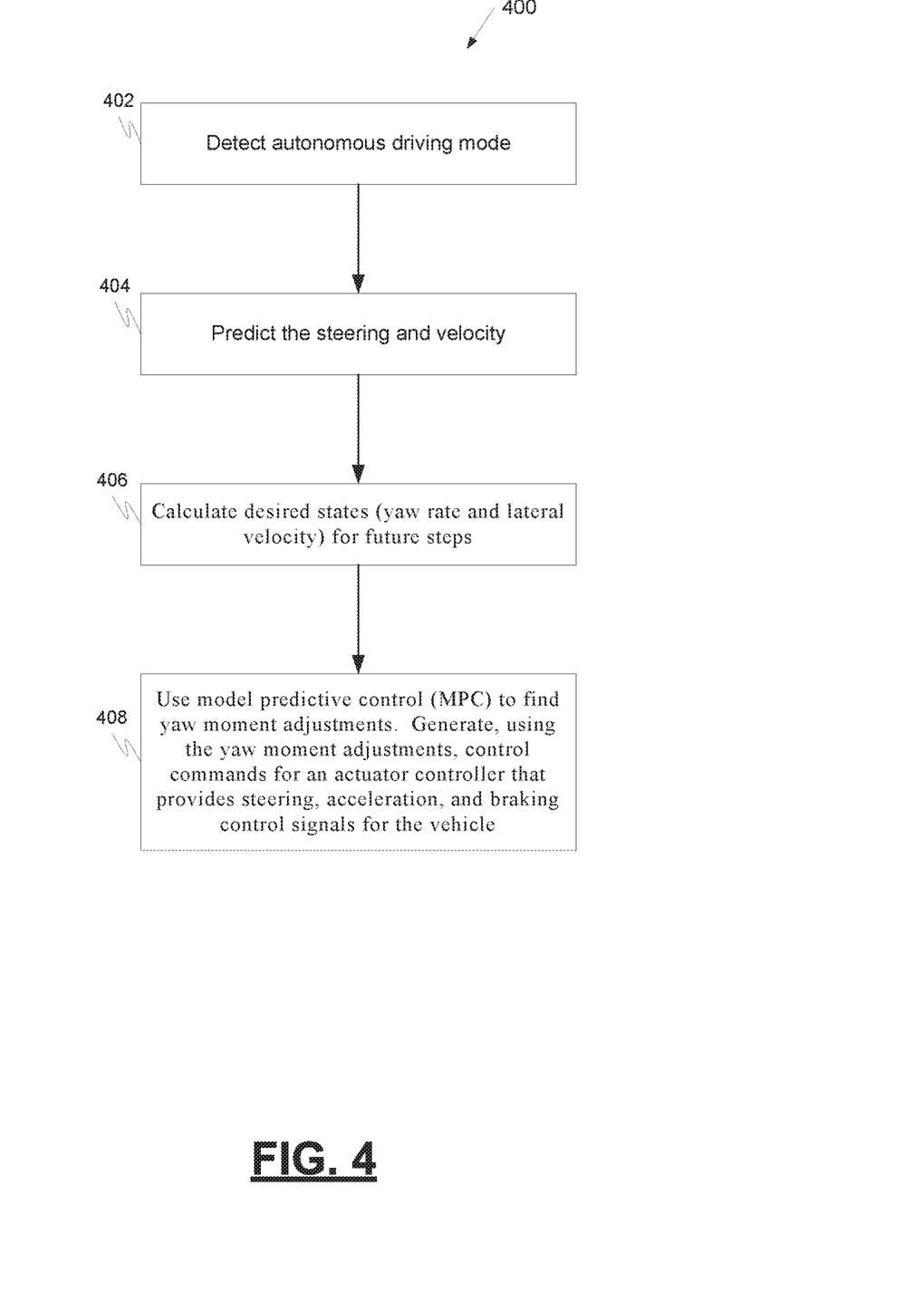
FIG. 4 is a process flow chart depicting an example process in a vehicle's stability control system for generating control commands for an actuator controller, in accordance with some embodiments.

FIG. 4 is a process flow chart depicting an example process 400 in a vehicle's stability control system for generating control commands for an actuator controller. In the example process 400, it is detected that the vehicle is operating in an autonomous driving mode (operation 402). Future steering and velocity states are planned by the vehicle (operation 404). The vehicle's stability control system calculates desired states such as yaw rate and lateral velocity for the current and future time steps (operation 406). The vehicle's stability control system uses model predictive control to determine yaw moment adjustments and to generate, using the yaw moment adjustments, control commands for an actuator controller that, for example, provides steering, braking, and acceleration control signals for the vehicle (operation 408). In this example, an ADCI may be used to calculate the desired states, an integrated controller or a higher level controller may be used to generate yaw moment adjustments, and an integrated controller or a lower level controller may be used to generate control commands for an actuator controller.

Figure 5:
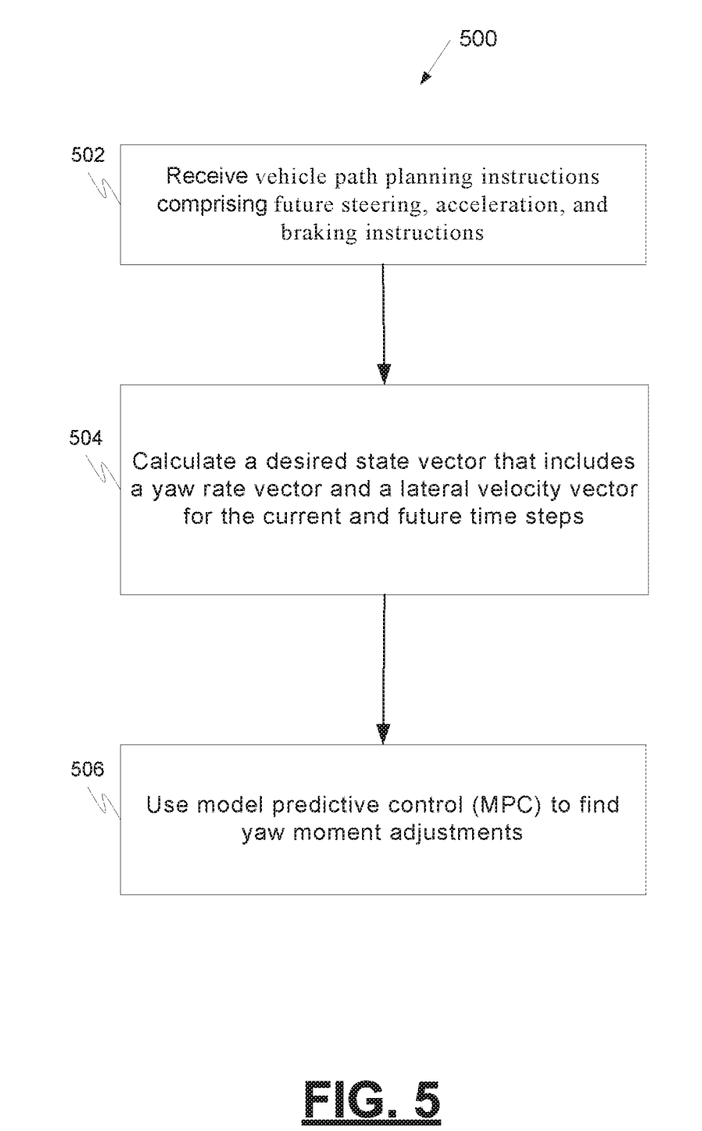
FIG. 5 is a process flow chart depicting another example process for generating a yaw moment control action for use in a vehicle's stability control system, in accordance with some embodiments.

FIG. 5 is a process flow chart depicting another example process 500 for generating a yaw moment control action for use in a vehicle's stability control system. In the example process 500, the vehicle's stability control system retrieves vehicle path planning instructions that include future steering, acceleration, and braking instructions (operation 502). The stability control system calculates a desired state vector that includes a yaw rate vector and a lateral velocity vector for the current and future time steps (operation 504). The stability control system uses model predictive control to determine yaw moment adjustments (operation 506). In this example, an ADCI may be used to calculate the desired state vector and a higher level controller may be used to determine yaw moment adjustments.

Figure 6:
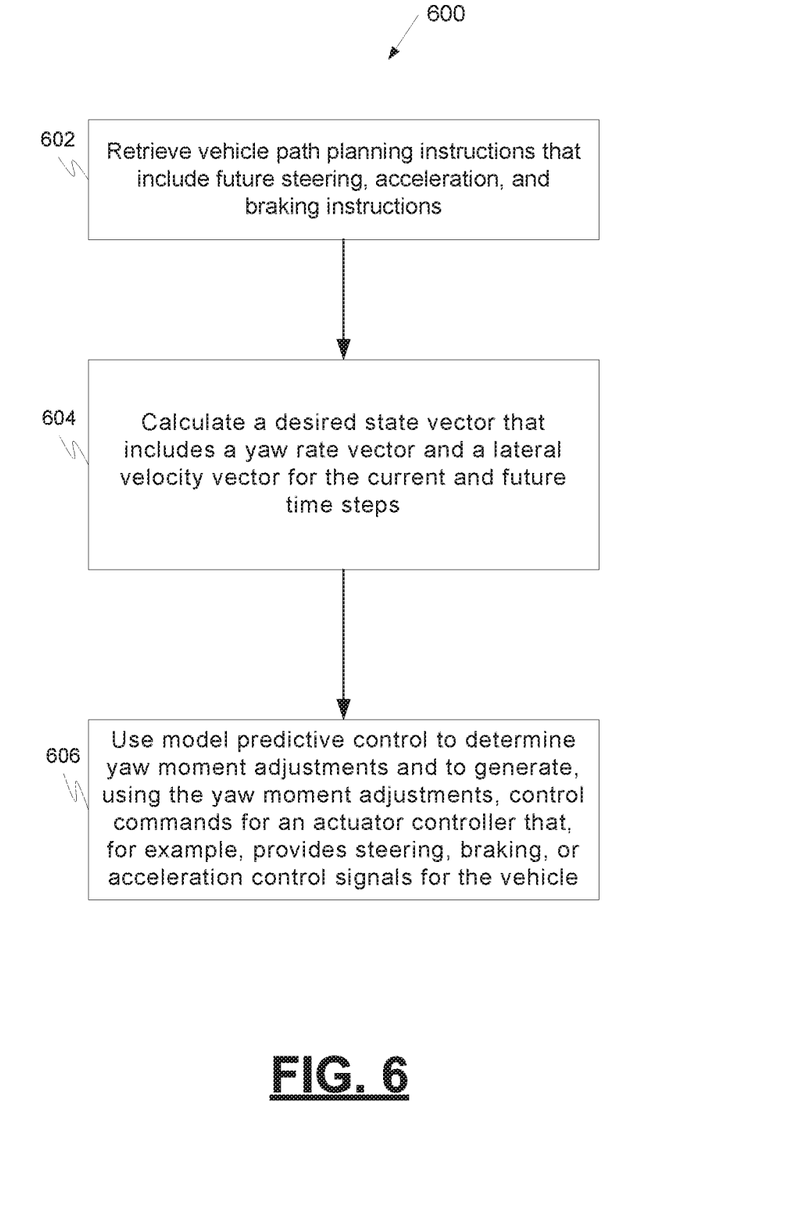
FIG. 6 is a process flow chart depicting another example process in a vehicle's stability control system for generating control commands for an actuator controller, in accordance with some embodiments.

FIG. 6 is a process flow chart depicting another example process 600 in a vehicle's stability control system for generating control commands for an actuator controller. In the example process 600, the vehicle's stability control system retrieves vehicle path planning instructions that include future steering, acceleration, and braking instructions (operation 602). The stability control system calculates a desired state vector that includes a yaw rate vector and a lateral velocity vector for the current and future time steps (operation 604). The vehicle's stability control system uses model predictive control to determine yaw moment adjustments and to generate, using the yaw moment adjustments, control commands for an actuator controller that, for example, provides steering, braking, or acceleration control signals for the vehicle (operation 606). In this example, an ADCI may be used to calculate the desired state vector, an integrated controller or a higher level controller may be used to generate yaw moment adjustments, and an integrated controller or a lower level controller may be used to generate control commands for an actuator controller.

Described herein are techniques for using future (pre-planned) driving commands in vehicle stability control systems. The described techniques allow for an automated driving command interpreter (ADCI) in a stability control system to take advantage of pre-planned motions to enhance the stability control quality. The described techniques can take advantage of predictable steering and acceleration/deceleration commands generated in autonomous and automated driving applications to better avoid unstable operating modes. The described techniques can take advantage of pre-planned commands and a preview of the road to assist in maintaining vehicle stability.

In one embodiment, a control system for providing a yaw moment control action is provided. The control system comprises a command interpreter and a control segment. The command interpreter is configured to generate desired current vehicle states, when a vehicle is driven manually, based on driver steering and acceleration inputs wherein the current vehicle states comprise a target yaw rate state and a target lateral velocity state. The command interpreter is further configured to generate a desired states vector, when the vehicle is driven autonomously, using vehicle path planning instructions, wherein the desired states vector comprise current and future ideal yaw rate states and current and future ideal lateral velocity states. The control segment is configured to generate a yaw moment control action for the current time using the desired current vehicle states when the vehicle is driven manually and generate a yaw moment control action for the current time using the desired states vector when the vehicle is driven autonomously. The control segment is further configured to send the generated yaw moment control action to a stability control system in the vehicle.

These aspects and other embodiments may include one or more of the following features. The vehicle path planning instructions may comprise future steering, acceleration, and braking instructions for the vehicle. The future steering, acceleration, and braking instructions may be generated based on the detection of perceived obstacles in the vehicle's path and the geometry of the road ahead in the direction the vehicle is traveling. The current and future ideal yaw rate states may comprise a plurality of desired yaw rate states into the future and the current and future ideal lateral velocity states may comprise a plurality of desired lateral velocity states into the future. The plurality of desired yaw rate states into the future may comprise a plurality of desired yaw rate states in the next few seconds and the plurality of desired lateral velocity states into the future may comprise a plurality of desired lateral velocity states in the next few seconds. Using the desired states vector to generate the yaw moment control action may comprise using a predictive control algorithm to generate the yaw moment control action. The predictive control algorithm may use future steering, acceleration, and braking profiles to determine optimum yaw moment control for the current time. The command interpreter may comprise one or more processors and may be configured by programming instructions. The control segment may comprise one or more processors and may be configured by programming instructions. The control segment may be further configured to generate control commands using the yaw moment control action to send to an actuator controller in the vehicle. The actuator controller may be selected from a braking actuator, a steering control actuator, and an accelerator actuator.

In another embodiment, a method in a vehicle stability control system is provided. The method comprises determining if the vehicle is being driven manually or autonomously, generating desired current vehicle states when the vehicle is driven manually based on driver steering and acceleration inputs wherein the current vehicle states comprise a target yaw rate state and a target lateral velocity state, and generating a desired states vector when the vehicle is driven autonomously using vehicle path planning instructions wherein the desired states vector comprises current and future ideal yaw rate states and current and future ideal lateral velocity states. The method further comprises generating a yaw moment control action for the current time using the desired current vehicle states when the vehicle is driven manually, generating a yaw moment control action for the current time using the desired states vector when the vehicle is driven autonomously, and using the generated yaw moment control action in the stability control system in the vehicle.

These aspects and other embodiments may include one or more of the following features. The vehicle path planning instructions may comprise future steering, acceleration, and braking instructions for the vehicle. The method may further comprise generating the future steering, acceleration, and braking instructions based on the detection of perceived obstacles in the vehicle's path and the geometry of the road ahead in the direction the vehicle is traveling. The current and future ideal yaw rate states may comprise a plurality of desired yaw rate states into the future and the current and future ideal lateral velocity states may comprise a plurality of desired lateral velocity states into the future. Generating the yaw moment control action using the desired states vector may comprise predicting the yaw moment control action using a predictive control algorithm. Predicting the yaw moment control action may comprise predicting using future steering, acceleration, and braking profiles to determine optimum yaw moment control for the current time. The method may further comprise generating control commands using the yaw moment control action to send to an actuator controller in the vehicle wherein the actuator controller is selected from a braking actuator, a steering control actuator, and an accelerator actuator.

In another embodiment, a command interpreter comprising one or more processors configured by programming instructions encoded on non-transient computer readable media causing the one or more processors to implement a method is provided. The method comprises generating desired current vehicle states when the vehicle is driven manually based on driver steering and acceleration inputs wherein the current vehicle states comprise a target yaw rate state and a target lateral velocity state and generating a desired states vector when the vehicle is driven autonomously using vehicle path planning instructions wherein the desired states vector comprises current and future ideal yaw rate states and current and future ideal lateral velocity states.

These aspects and other embodiments may include one or more of the following features. The vehicle path planning instructions may comprise future steering, acceleration, and braking instructions for the vehicle. The method may further comprise generating the future steering, acceleration, and braking instructions based on the detection of perceived obstacles in the vehicle's path and the geometry of the road ahead in the direction the vehicle is traveling.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A control system for providing a yaw moment control action to a stability control system in a vehicle to ensure vehicle stability, the control system comprising one or more processors configured by programming instructions to:
    generate desired current vehicle states, when the vehicle is driven manually, based on driver steering and acceleration inputs, the current vehicle states comprising a target yaw rate state and a target lateral velocity state;
    generate a desired states vector, when the vehicle is driven autonomously, using vehicle path planning instructions, the desired states vector comprising current and future desired yaw rate states and current and future desired lateral velocity states;
    generate a first yaw moment control action for current conditions using the desired current vehicle states when the vehicle is driven manually;
    generate a second yaw moment control action for current conditions using the desired states vector when the vehicle is driven autonomously; and
    send the first yaw moment control action to the stability control system in the vehicle to ensure vehicle stability when the vehicle is driven manually and send the second yaw moment control action to the stability control system in the vehicle to ensure vehicle stability when the vehicle is driven autonomously.

2. The control system according to claim 1 wherein the vehicle path planning instructions comprise future steering, acceleration, and braking instructions for the vehicle.

3. The control system according to claim 2 wherein the future steering, acceleration, and braking instructions are generated based on a detection of perceived obstacles in a path of the vehicle and a geometry of a road ahead in a direction the vehicle is traveling.

4. The control system according to claim 1 wherein the current and future desired yaw rate states comprise a plurality of desired yaw rate states for an upcoming period of time and the current and future desired lateral velocity states comprise a plurality of desired lateral velocity states for an upcoming period of time.

5. The control system according to claim 4 wherein the plurality of desired yaw rate states for the upcoming period of time comprises a plurality of desired yaw rate states in a selected time horizon and wherein the plurality of desired lateral velocity states for the upcoming period of time comprises a plurality of desired lateral velocity states in the selected time horizon.

6. The control system according to claim 1 wherein using the desired states vector to generate the second yaw moment control action comprises using a predictive control algorithm to generate the second yaw moment control action.

7. The control system according to claim 6 wherein the predictive control algorithm uses future steering, acceleration, and braking profiles to determine optimum yaw moment control for the current conditions.

8. The control system according to claim 1 wherein the one or more processors are further configured to generate control commands using the first yaw moment control action when the vehicle is driven manually and the second yaw moment control action when the vehicle is driven autonomously to send to an actuator controller in the vehicle, the actuator controller selected from a braking actuator, a steering control actuator, and an accelerator actuator.

9. A method in a vehicle stability control system to ensure vehicle stability, the method comprising:
    determining if a vehicle is being driven manually or autonomously;
    generating desired current vehicle states when the vehicle is driven manually based on driver steering and acceleration inputs, the current vehicle states comprising a target yaw rate state and a target lateral velocity state;
    generating a desired states vector when the vehicle is driven autonomously using vehicle path planning instructions, the desired states vector comprising current and future desired yaw rate states and current and future desired lateral velocity states;
    generating a first yaw moment control action for current conditions using the desired current vehicle states when the vehicle is driven manually;
    generating a second yaw moment control action for current conditions using the desired states vector when the vehicle is driven autonomously; and
    using the first yaw moment control action in the stability control system in the vehicle to ensure vehicle stability when the vehicle is driven manually and using the second yaw moment control action in the stability control system in the vehicle to ensure vehicle stability when the vehicle is driven autonomously.

10. The method of claim 9 wherein the vehicle path planning instructions comprise future steering, acceleration, and braking instructions for the vehicle.

11. The method of claim 10 wherein the future steering, acceleration, and braking instructions have been generated based on a detection of perceived obstacles in a path of the vehicle and a geometry of a road ahead in a direction the vehicle is traveling.

12. The method of claim 9 wherein the current and future desired yaw rate states comprise a plurality of desired yaw rate states for an upcoming period of time and the current and future desired lateral velocity states comprise a plurality of desired lateral velocity states for an upcoming period of time.

13. The method according to claim 12 wherein the plurality of desired yaw rate states for the upcoming period of time comprises a plurality of desired yaw rate states in a selected time horizon and wherein the plurality of desired lateral velocity states for the upcoming period of time comprises a plurality of desired lateral velocity states in the selected time horizon.

14. The method of claim 9 wherein generating the second yaw moment control action using the desired states vector comprises predicting the second yaw moment control action using a predictive control algorithm.

15. The method of claim 14 wherein predicting the second yaw moment control action comprises predicting using future steering, acceleration, and braking profiles to determine optimum yaw moment control for the current conditions.

16. The method of claim 9 further comprising generating control commands using the first yaw moment control action when the vehicle is driven manually and the second yaw moment control action when the vehicle is driven autonomously to send to an actuator controller in the vehicle, the actuator controller selected from a braking actuator, a steering control actuator, and an accelerator actuator.

17. Non-transitory computer readable media encoded with programming instructions configurable to cause a processor in a vehicle to:
  determine if the vehicle is being driven manually or autonomously;
  generate desired current vehicle states when the vehicle is driven manually based on driver steering and acceleration inputs, the current vehicle states comprising a target yaw rate state and a target lateral velocity state;
  generate a desired states vector when the vehicle is driven autonomously using vehicle path planning instructions, the desired states vector comprising current and future desired yaw rate states and current and future desired lateral velocity states;
  generate a first yaw moment control action for current conditions using the desired current vehicle states when the vehicle is driven manually;
  generate a second yaw moment control action for current conditions using the desired states vector when the vehicle is driven autonomously; and
  send the first yaw moment control action to a stability control system in the vehicle to ensure vehicle stability when the vehicle is driven manually and send the second yaw moment control action to the stability control system in the vehicle to ensure vehicle stability when the vehicle is driven autonomously.

18. The non-transitory computer readable media of claim 17, wherein the vehicle path planning instructions comprise future steering, acceleration, and braking instructions for the vehicle.

19. The non-transitory computer readable media of claim 18, wherein the future steering, acceleration, and braking instructions have been generated based on a detection of perceived obstacles in a path of the vehicle and a geometry of a road ahead in a direction the vehicle is traveling.

20. The non-transitory computer readable media of claim 17, wherein the current and future desired yaw rate states comprise a plurality of desired yaw rate states for an upcoming period of time and the current and future desired lateral velocity states comprise a plurality of desired lateral velocity states for an upcoming period of time.

* * * * *